April 7, 1936.                    J. M. KING                    2,036,279
                              AUXILIARY PARACHUTE
                              Filed Sept. 30, 1935
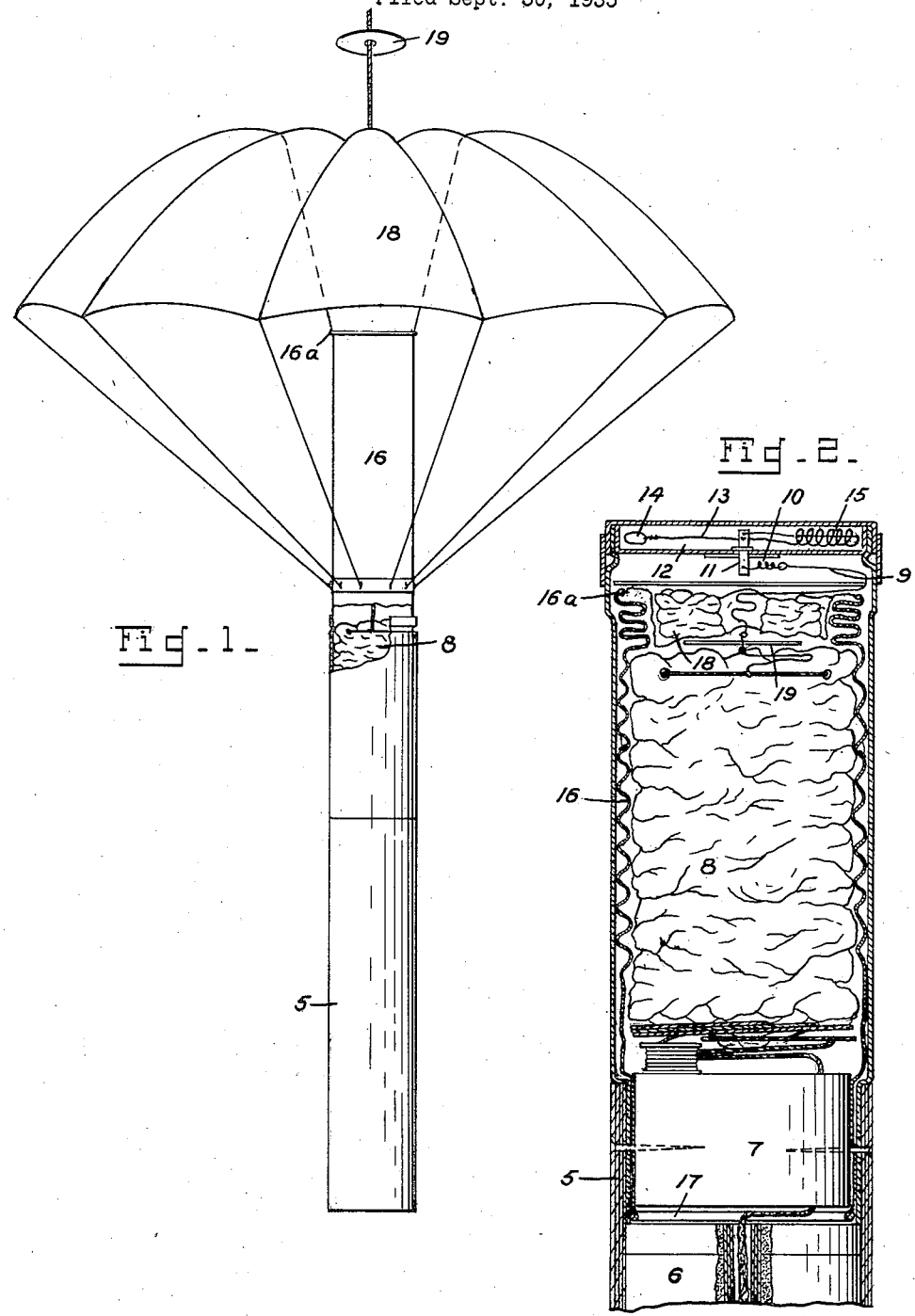
Inventor
John M. King
By W. N. Roach
       Attorney

UNITED STATES PATENT OFFICE 2,036,279

AUXILIARY PARACHUTE

John M. King, Dover, N. J.

Application September 30, 1935, Serial No. 42,867

2 Claims. (Cl. 102—24)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an auxiliary parachute arrangement for flares, bombs and similar bodies adapted to be launched from aircraft.

When a parachute flare is launched from a fast moving aircraft the shock on distension of the parachute frequently causes it to be damaged and rendered inoperative. The purpose of this invention is to provide an auxiliary parachute which will function to decelerate the flare sufficiently to permit the main parachute to be opened without becoming damaged. The auxiliary parachute is connected directly with the flare through a fabric sleeve which houses the main parachute.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a view in side elevation showing the auxiliary flare distended.

Fig. 2 is a longitudinal sectional view of the flare with the parachute housed therein.

Referring to the drawing by characters of reference, there is shown a flare including a container 5 carrying an illuminant 6, an igniting mechanism housing 7 and a main parachute 8 which is attached to the housing 7 and is adapted to suspend the flare during its flight. The main parachute is withdrawn from the container in a well known manner, specifically by means of a pull-cord 9 which is connected by means of a tear-wire 10 to a stem 11 passing through an inner cover 12. A hangwire 13 attached to the outer part of the stem and normally housed in the cover 12 is provided with a loop 14 whereby it is associated with the launching apparatus of aircraft. An outer cover 15 is removed when the flare is prepared for launching. The parts heretofore described are all present in the conventional flare.

A sleeve 16 lining the upper part of the container and housing the main parachute 8 has a rolled inner end 17 confined by the housing 7. The sleeve is of sufficient length to extend from the container but the outer portion is normally folded within the container. An auxiliary parachute 18 is attached to the outer end of the sleeve through a metal ring 16a secured to the sleeve and has shrouds connecting it to the intermediate portion of the sleeve 16. The auxiliary parachute is normally folded and housed in the container on the outer side of the main parachute. A disc 19 on the pull-out cord 9 is interposed between the parachute and serves to withdraw the auxiliary parachute from the container, before the main parachute is withdrawn.

The auxiliary parachute is distended immediately upon being withdrawn from the container and before the main parachute is withdrawn. It decelerates the flare sufficiently to permit distention of the main parachute without danger of breakage or damage.

The weight of the falling flare causes the tear wire 10 to be broken.

I claim:—

1. A container, a sleeve lining the container and having its inner end secured thereto, a main parachute housed within the sleeve and secured to the container, an auxiliary parachute secured to the outer part of the sleeve and housed on the outer side of the main parachute, and means whereby both parachutes are withdrawn from the container.

2. A container, a sleeve lining the container and having its inner end secured thereto, a main parachute housed within the sleeve and secured to the container, an auxiliary parachute secured to the outer part of the sleeve and means whereby both parachutes are withdrawn from the container.

JOHN M. KING.